United States Patent
Hsu et al.

(10) Patent No.: US 9,887,814 B2
(45) Date of Patent: Feb. 6, 2018

(54) CONTROL CIRCUIT FOR CONTROLLING WIRELESS USER EQUIPMENT TO ACTIVELY RETRANSMIT RRC MESSAGE

(71) Applicant: REALTEK SEMICONDUCTOR CORP., Hsinchu (TW)

(72) Inventors: Chao-Yuan Hsu, Taipei (TW); Chen Chen, New Taipei (TW); Chi-Ming Cheng, Taipei (TW); Han-Sheng Hung, New Taipei (TW); Ting-Yu Wei, Taipei (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 147 days.

(21) Appl. No.: 14/972,832

(22) Filed: Dec. 17, 2015

(65) Prior Publication Data

US 2016/0285592 A1 Sep. 29, 2016

(30) Foreign Application Priority Data

Mar. 23, 2015 (TW) .............................. 104109221 A

(51) Int. Cl.
*H04L 1/18* (2006.01)
*H04W 76/04* (2009.01)

(52) U.S. Cl.
CPC ............. *H04L 1/189* (2013.01); *H04W 76/04* (2013.01)

(58) Field of Classification Search
None
See application file for complete search history.

(56) References Cited

U.S. PATENT DOCUMENTS

| | | | | |
|---|---|---|---|---|
| 2006/0281463 | A1* | 12/2006 | Yang | H04W 36/18 455/442 |
| 2009/0201864 | A1* | 8/2009 | Ahluwalia | H04W 72/1263 370/329 |
| 2011/0222482 | A1 | 9/2011 | Lee | |
| 2011/0274147 | A1* | 11/2011 | Schelstraete | H04L 1/1887 375/220 |
| 2013/0189990 | A1* | 7/2013 | Kim | H04W 36/30 455/436 |

FOREIGN PATENT DOCUMENTS

| | | | |
|---|---|---|---|
| EP | 2 615 863 | A1 | 7/2013 |
| EP | 2 670 077 | A1 | 12/2013 |

* cited by examiner

*Primary Examiner* — Eunsook Choi
(74) *Attorney, Agent, or Firm* — Birch, Stewart, Kolasch & Birch, LLP

(57) ABSTRACT

A control circuit of a wireless user equipment includes: a message generating circuit configured to operably generate a target RRC (radio resource control) messages to be transmitted to a communication station through a wireless communication circuit of the wireless user equipment, wherein the target RRC message is a predetermined-type RRC message; and a data control circuit coupled with the message generating circuit and configured to operably transmit the target RRC message to the communication station through the wireless communication circuit, and to retransmit the target RRC message to the communication station through the wireless communication circuit at least one more time before a negative acknowledgement (NACK) corresponding to the target RRC message is received by the wireless communication circuit.

7 Claims, 2 Drawing Sheets

CONTROL CIRCUIT FOR CONTROLLING WIRELESS USER EQUIPMENT TO ACTIVELY RETRANSMIT RRC MESSAGE

CROSS-REFERENCE TO RELATED APPLICATIONS

This application claims the benefit of priority to Patent Application No. 104109221, filed in Taiwan on Mar. 23, 2015; the entirety of which is incorporated herein by reference for all purposes.

BACKGROUND

The disclosure generally relates to a mobile communication system and, more particularly, to a control circuit for controlling a wireless user equipment to actively retransmit RRC messages.

In a conventional mobile communication system, a wireless user equipment (UE) uploads some important radio resource control (RRC) messages, such as RRC connection reconfiguration complete messages or measurement report messages containing measurement report data, to the network side in response to the signal channel quality changes or based on the requirement of handover procedure.

The signal environment of the wireless UE changes all the time. If the wireless UE has a poor signal transmission quality, a specific RRC message transmitted from the wireless UE may be unable to be received by the network side. In this situation, according to standard procedure defined by the traditional mobile communication system, the wireless UE is not permitted to retransmit the specific RRC message to the network side until the wireless UE receives a negative acknowledgement (NACK) corresponding to the specific RRC message transmitted from the network side.

However, spending time to wait for the NACK message may often delay the timing of receiving the specific RRC message at the network side, thereby causing connection lost or call drop for the wireless UE.

DETAILED DESCRIPTION

Reference is made in detail to embodiments of the invention, which are illustrated in the accompanying drawings. The same reference numbers may be used throughout the drawings to refer to the same or like parts, components, or operations.

Figure 1:
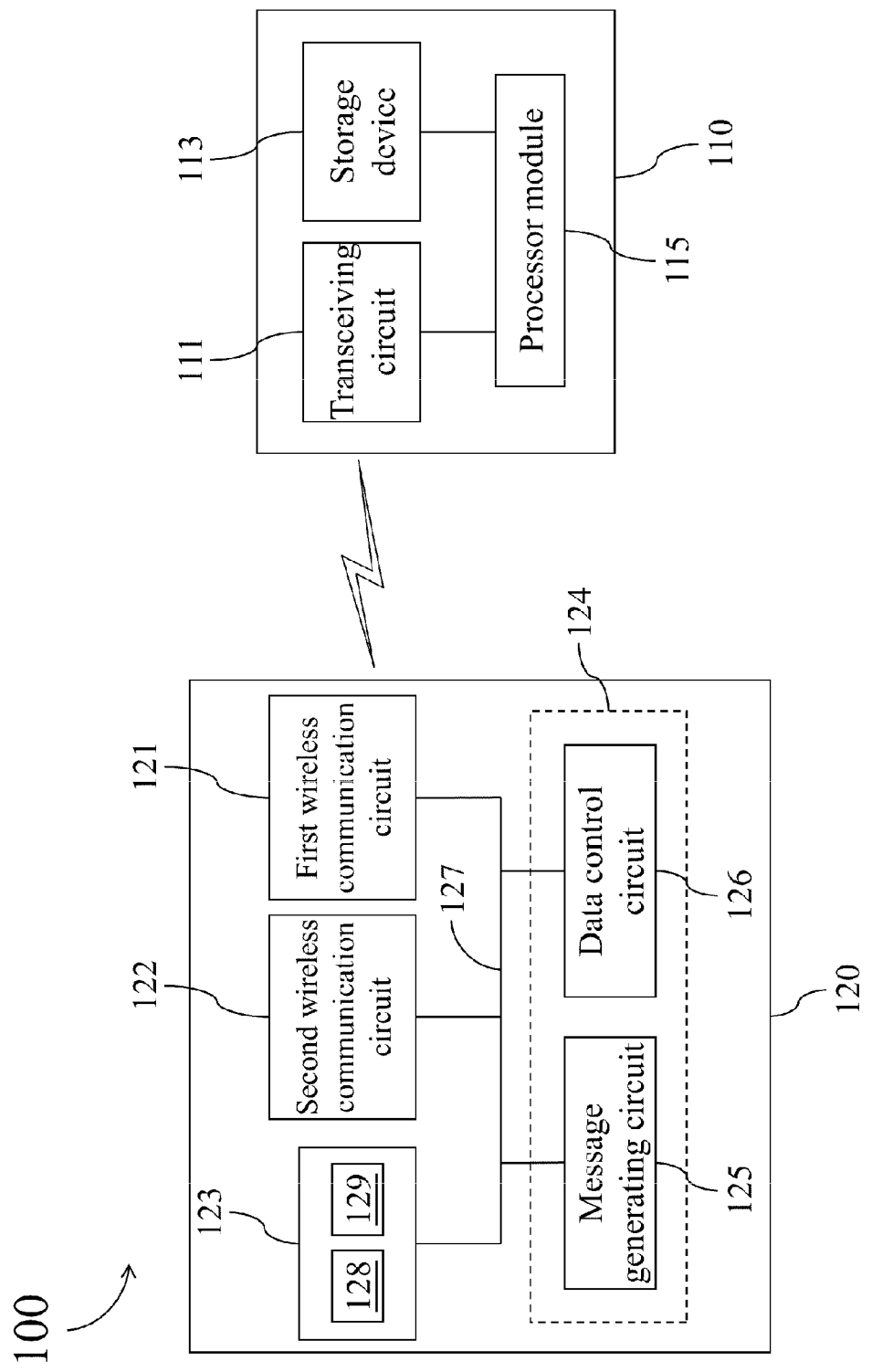
FIG. 1 shows a simplified functional block diagram of a mobile communication system according to one embodiment of the present disclosure.

FIG. 1 shows a simplified functional block diagram of a mobile communication system 100 according to one embodiment of the present disclosure. The mobile communication system 100 comprises multiple communication stations and multiple wireless user equipments (UEs). For simplicity of illustration, only a communication station 110 and a wireless UE 120 are shown in FIG. 1 as an example. As shown in FIG. 1, the communication station 110 comprises a transceiving circuit 111, a storage device 113, and a processor module 115. The wireless UE 120 comprises a first wireless communication circuit 121, a second wireless communication circuit 122, a memory device 123, and a control circuit 124. The control circuit 124 comprises a message generating circuit 125 and a data control circuit 126. Other communication stations and wireless UEs in the mobile communication system 100 have similar structure as the communication station 110 and the wireless UE 120.

In the communication station 110, the transceiving circuit 111 is configured to operably transmit signal by adopting a first radio access technology (RAT). The storage device 113 is configured to operably store data required for the operations of the communication station 110. The processor module 115 is coupled with the transceiving circuit 111 and the storage device 113, and configured to operably control the operations of the transceiving circuit 111 and the storage device 113.

In the wireless UE 120, the first wireless communication circuit 121 is configured to operably communicate with the transceiving circuit 111 of the communication station 110 by adopting the first RAT. The second wireless communication circuit 122 is configured to operably communicate with one or more access points (APs, not shown in FIG. 1) by adopting a second RAT different from the first RAT. The memory device 123 is configured to operably store data received by the first wireless communication circuit 121 and the second wireless communication circuit 122, and to operably store a target message queue 128 and a common message queue 129. The control circuit 124 is coupled with the first wireless communication circuit 121, the second wireless communication circuit 122, and the memory device 123. The control circuit 124 is configured to operably access the data stored in the memory device 123 via a signal bus 127, and to operably control the operations of the first wireless communication circuit 121, the second wireless communication circuit 122, and the memory device 123.

In practice, each of the transceiving circuit 111 and the first wireless communication circuit 121 may comprise one or more antennas, one or more modulators/demodulators, one or more analog signal processing circuits, and/or one or more digital processing circuits for communicating with other devices by utilizing the first RAT. The second wireless communication circuit 122 may comprise one or more antennas, one or more modulators/demodulators, one or more analog signal processing circuits, and/or one or more digital processing circuits for communicating with other devices by utilizing the second RAT. Each of the storage device 113 and the memory device 123 may be realized with one or more volatile/non-volatile memory circuits, such as registers, hard drives, or flash memory devices. Each of the processor module 115 and the control circuit 124 may be realized with one or more microprocessors, one or more network processors, one or more digital signal processing circuits, and/or other suitable processing circuits.

In other words, the message generating circuit 125 and the data control circuit 126 of the control circuit 124 may be realized with separate circuits, or may be integrated in the same circuit.

For simplicity of illustration, other components in the mobile communication system 100 and their connection relationships are not illustrated in FIG. 1.

As can be appreciated from the foregoing descriptions, the wireless UE 102 is capable of communicating with the communication station 110 adopting the first RAT, and capable of communicating with an available AP adopting the second RAT. In practice, the first RAT may refer to one or more wireless wide area network (WWAN) technologies, wireless metropolitan area network (WMAN) technologies, or other wireless communication technologies suitable for a wider communication range, such as WiMAX, GSM, UMTS, HSPA, LTE, LTE-Advanced and other 3GPP RATs. The second RAT may refer to one or more wireless local area network (WLAN) technologies, or other wireless communication technologies suitable for a shorter communication range (compared with the first RAT), such as IEEE 802.11 series RATs.

For the illustrative purpose, it is assumed hereinafter that the first RAT is referred to at least one of the 3GPP RATs. In this situation, the communication station 110 may be realized with a 3GPP base station (BS), such as a Node B or an Evolved Node B (eNodeB or eNB). In addition, the communication station 110 may be co-located in substantially the same location along with one or more access points.

In operations, the control circuit 124 of the wireless UE 120 generates various RRC messages from time to time, and stores these RRC messages in the memory device 123, so that these RRC messages can be transmitted to the communication station 110 at appropriate opportunities.

In the traditional approach, after a specific RRC message is transmitted from a conventional wireless UE to the communication station 110, the conventional wireless UE is not allowed to retransmit the specific RRC message to the communication station 110 until a NACK message corresponding to the specific RRC message is transmitted from the communication station 110 to the conventional wireless UE. As described previously, such retransmission mechanism often delays the timing of receiving the specific RRC message at the communication station 110, thereby causing connection lost or call drop for the conventional wireless UE.

In contrast, in the mobile communication system 100, the control circuit 124 controls the wireless UE 120 to actively retransmit some important RRC messages to the communication station 110 before the wireless UE 120 receives a corresponding NACK message transmitted from the communication station 110 so as to avoid delaying the timing of receiving the specific RRC message at the communication station 110.

The operations of that the control circuit 124 controls the wireless UE 120 to actively retransmit RRC messages will be further described in the following by reference to FIG. 2.

Figure 2:
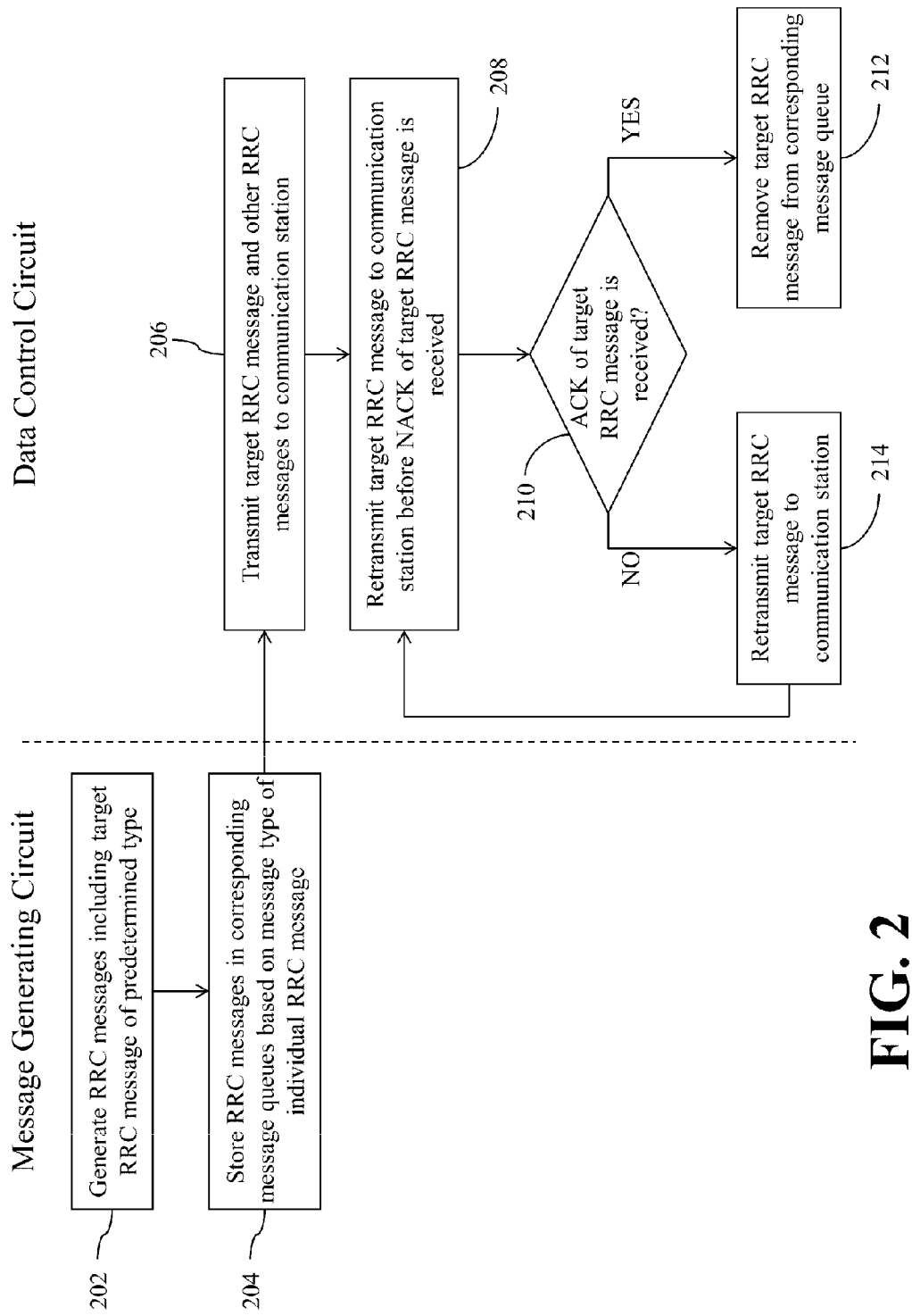
FIG. 2 shows a simplified flowchart illustrating a method for actively retransmitting RRC messages according to one embodiment of the present disclosure.

FIG. 2 shows a simplified flowchart illustrating a method for actively retransmitting RRC messages according to one embodiment of the present disclosure. In FIG. 2, operations within a column under the name of a specific device are operations to be performed by the specific device. For example, operations within a column under the label "message generating circuit" are operations to be performed by the message generating circuit 125, and operations within a column under the label "data control circuit" are operations to be performed by the data control circuit 126.

In the operation 202, the message generating circuit 125 of the control circuit 124 generates RRC messages (including a target RRC message MSG_T of a predetermined type) in response to the signal channel quality changes, according to the instruction from a certain communication station (such as the communication station 110 or other communication station) in the mobile communication system 100, or based on other requirements.

For the illustrative purpose, it is assumed hereinafter that in the operation 202 the control circuit 124 also generates other type RRC messages, such as a first RRC message MSG_A and a second RRC message MSG_B, in addition to the target RRC message MSG_T of the predetermined type.

In the operation 204, the message generating circuit 125 of the control circuit 124 respectively stores the generated RRC messages in corresponding message queues based on the message type of individual RRC message.

In the operation 204, which message queue is to be utilized for storing a specific RRC message (such as the above-mentioned target RRC message MSG_T, first RRC message MSG_A, or second RRC message MSG_B) may be decided by the message generating circuit 125 according to the message type of the specific RRC message.

In general, the RRC messages may be categorized into three types: the RRC connection reconfiguration complete messages, the measurement report messages containing measurement report data, and RRC messages other than the RRC connection reconfiguration complete messages and the measurement report messages.

In practice, the measurement report contained in a measurement report message may be an event trigger report or a periodical report. The event trigger report may be one of the reports of type A1-A6, or may be one of the reports of type B1-B2. The periodical report may be an intra-frequency measurement report, an inter-frequency measurement report, or an inter-RAT measurement report.

In the present disclosure, the RRC message of the predetermined type refers to the RRC messages with relatively higher importance.

In one embodiment, the message generating circuit 125 defines that only the RRC connection reconfiguration complete messages are categorized as the RRC messages of the predetermined type. In this situation, the target RRC message MSG_T of the predetermined type is an RRC connection reconfiguration complete message, while the first RRC message MSG_A and the second RRC message MSG_B are RRC messages other than the RRC connection reconfiguration complete messages.

In another embodiment, the message generating circuit 125 defines that only the RRC connection reconfiguration complete messages and the measurement report messages are categorized as the RRC messages of the predetermined type. In this situation, the target RRC message MSG_T of the predetermined type is either an RRC connection reconfiguration complete message or a measurement report message, while the first RRC message MSG_A and the second RRC message MSG_B are RRC messages other than the RRC connection reconfiguration complete messages and the measurement report messages.

In another embodiment, the message generating circuit 125 defines that only the RRC connection reconfiguration complete messages and measurement report messages containing event trigger reports are categorized as the RRC messages of the predetermined type. In this situation, the target RRC message MSG_T of the predetermined type is either an RRC connection reconfiguration complete message or a measurement report message containing an event trigger report, while the first RRC message MSG_A and the second RRC message MSG_B are RRC messages other than the RRC connection reconfiguration complete messages and the measurement report messages containing event trigger reports.

In the operation 204, if the specific RRC message is an RRC message of the predetermined type, the message generating circuit 125 may store the specific RRC message in the target message queue 128 of the memory device 123. In contrast, if the specific RRC message is not an RRC message of the predetermined type, the message generating circuit 125 may store the specific RRC message in the common message queue 129 of the memory device 123. Accordingly, the message generating circuit 125 stores the target RRC message MSG_T of the predetermined type in the target message queue 128, and stores the first RRC message MSG_A the second RRC message MSG_B, which are not RRC message of the predetermined type, in the common message queue 129 in the operation 204.

As a result, the data control circuit 126 is enabled to rapidly determine whether a specific RRC message is an important RRC message in the subsequent operations based on which message queue is utilized for storing the specific RRC message.

In the operation 206, the data control circuit 126 transmits the target RRC message MSG_T and other RRC messages (such as the first RRC message MSG_A) stored in the memory device 123 to the transceiving circuit 111 of the communication station 110 through the first wireless communication circuit 121.

Please note that before a NACK corresponding to the target RRC message MSG_T transmitted from the communication station 110 is received by the first wireless communication circuit 121, the data control circuit 126 actively performs the operation 208 to retransmit the target RRC message MSG_T to the communication station 110 through the first wireless communication circuit 121.

When the next transmission opportunity occurs, the data control circuit 126 performs the operation 210 to determine whether a positive acknowledgement (ACK) corresponding to the target RRC message MSG_T and generated by the communication station 110 is received by the first wireless communication circuit 121. If the ACK corresponding to the target RRC message MSG_T is received by the first wireless communication circuit 121, the data control circuit 126 determines that the target RRC message MSG_T has been successfully received by the communication station 110. In this situation, the data control circuit 126 performs the operation 212.

In contrast, if the first wireless communication circuit 121 has not yet received any ACK corresponding to the target RRC message MSG_T, the data control circuit 126 determines that the target RRC message MSG_T has not yet successfully received by the communication station 110. In this situation, the data control circuit 126 performs the operation 214.

In the operation 212, the data control circuit 126 removes the target RRC message MSG_T from the corresponding target message queue 128.

In the operation 214, the data control circuit 126 again retransmits the target RRC message MSG_T to the communication station 110 through the first wireless communication circuit 121.

In the operation 214, if a protocol data unit (PDU) to be transmitted to the communication station 110 has a sufficient payload size, the data control circuit 126 may write the target RRC message MSG_T stored in the target message queue 128 along with at least part of another RRC message (such as the second RRC message MSG_B) stored in the common message queue 129 into the same PDU, and then transmit the resulting PDU to the communication station 110 through the first wireless communication circuit 121.

On the contrary, if the PDU to be transmitted to the communication station 110 does not has a sufficient payload size for recording the entire target RRC message MSG_T, the data control circuit 126 may divide the target RRC message MSG_T into multiple data segments, respectively write the data segments into multiple PDUs, and then transmit those PDUs to the communication station 110 through the first wireless communication circuit 121.

In practice, before the NACK message corresponding to the target RRC message MSG_T is received by the first wireless communication circuit 121, the data control circuit 126 may retransmit the target RRC message MSG_T to the communication station 110 through the first wireless communication circuit 121 many times, until an ACK message corresponding to the target RRC message MSG_T and generated by the communication station 110 is received by the first wireless communication circuit 121.

As can be appreciated from the foregoing descriptions, before the wireless UE 120 receives a NACK corresponding to the target RRC message MSG_T from the communication station 110, the data control circuit 126 controls the wireless UE 120 to actively retransmit the target RRC message MSG_T to the communication station 110 at least one more time, so as to effectively increase the possibility that the target RRC message MSG_T can be successfully received by the communication station 110. In addition, since the wireless UE 120 needs not to spend extra time to wait for the NACK before retransmits the target RRC message MSG_T, it effectively avoids delay of receiving the target RRC message MSG_T at the communication station 110, thereby significantly reducing the possibility of connection lost or call drop for the wireless UE 120.

Please note that the executing order of the operations in FIG. 2 is merely an exemplary embodiment, rather than a restriction to the practical implementations. For example, the operation 202 and the operation 204 may be performed concurrently.

Additionally, in some embodiments, the data control circuit 126 may retransmit the target RRC message MSG_T to the communication station 110 before the NACK message corresponding to the target RRC message MSG_T is received by the first wireless communication circuit 121 only if a signal transmission quality between the first wireless communication circuit 121 and the communication station 110 is below a predetermined level. In the situation where the signal transmission quality between the first wireless communication circuit 121 and the communication station 110 is higher than the predetermined level, the above-mentioned retransmission may be omitted to reduce the power consumption of the wireless UE 120.

The term "and/or" may comprise any and all combinations of one or more of the associated listed items. In addition, the singular forms "a," "an," and "the" herein are intended to comprise the plural forms as well, unless the context clearly indicates otherwise.

Other embodiments of the invention will be apparent to those skilled in the art from consideration of the specification and practice of the invention disclosed herein. It is intended that the specification and examples be considered as exemplary only, with a true scope and spirit of the invention indicated by the following claims.

What is claimed is:

1. A control circuit of a wireless user equipment for controlling the wireless user equipment to actively retransmit radio resource control messages to a communication station, the control circuit comprising:
   a message generating circuit configured to operably generate a target RRC message to be transmitted to the communication station through a wireless communication circuit of the wireless user equipment, wherein the target RRC message belongs to a predetermined type of RRC message; and
   a data control circuit, coupled with the message generating circuit, configured to operably transmit the target RRC message to the communication station through the wireless communication circuit and to operably retransmit the target RRC message to the communication station through the wireless communication circuit at least one more time before a negative acknowledgement message corresponding to the target RRC message and generated by the communication station is received by the wireless communication circuit, wherein the message generating circuit stores the target RRC message in a target message queue so that the data control circuit can read the target RRC message from the target message queue, and the message generating circuit is further configured to operably generate a first RRC message to be transmitted to the communication station through the wireless communication circuit, and wherein if the first RRC message does not belong to the predetermined type of RRC message, the message generating circuit stores the first RRC message in a common message queue different from the target message queue, so that the data control circuit can read the first RRC message from the common message queue, and wherein the target RRC message is an RRC connection reconfiguration complete message or a measurement report message containing an event trigger report, and the first RRC message is an RRC message other than an RRC connection reconfiguration complete message or a measurement report message containing an event trigger report.

2. The control circuit of claim 1, wherein before the NACK message is received by the wireless communication circuit, the data control circuit retransmits the target RRC message to the communication station through the wireless communication circuit at least one more time until a positive acknowledgement message corresponding to the target RRC message and generated by the communication station is received by the wireless communication circuit.

3. The control circuit of claim 1, wherein the data control circuit writes the target RRC message along with at least part of a second RRC message into a same protocol data unit to be transmitted to the communication station.

4. The control circuit of claim 1, wherein the data control circuit divides the target RRC message into multiple data segments and respectively writes the multiple data segments into multiple protocol data units to be transmitted to the communication station.

5. The control circuit of claim 1, wherein the target RRC message is an RRC connection reconfiguration complete message and the first RRC message is an RRC message other than an RRC connection reconfiguration complete message.

6. The control circuit of claim 1, wherein the target RRC message is an RRC connection reconfiguration complete message or a measurement report message, and the first RRC message is an RRC message other than an RRC connection reconfiguration complete message and a measurement report message.

7. The control circuit of claim 1, wherein the data control circuit retransmits the target RRC message to the communication station before the NACK message is received by the wireless communication circuit only if a signal transmission quality between the wireless communication circuit and the communication station is below a predetermined level.

* * * * *